United States Patent [19]
Kim

[11] Patent Number: 5,901,335
[45] Date of Patent: May 4, 1999

[54] CIRCUIT FOR DETECTING A SYNCHRONOUS WORD SIGNAL FROM A MPEG BIT STREAM IN VIDEO-AUDIO DECODING SYSTEM

[75] Inventor: Geum-Cheol Kim, Seoul, Rep. of Korea

[73] Assignee: Hyundai Electronics Industries Co., Ltd., Kyonggi-do, Rep. of Korea

[21] Appl. No.: 08/880,109

[22] Filed: Jun. 20, 1997

[30] Foreign Application Priority Data

Jun. 29, 1996 [KR] Rep. of Korea ................... 96-26005

[51] Int. Cl.$^6$ ........................................ G06F 3/00
[52] U.S. Cl. ............................. 395/898; 395/885
[58] Field of Search .................... 395/365, 898, 395/885, 888, 891, 893, 894, 800.35

[56] References Cited

U.S. PATENT DOCUMENTS

| | | | |
|---|---|---|---|
| 5,101,394 | 3/1992 | Endoh | 369/59 |
| 5,247,363 | 9/1993 | Sun et al. | 348/616 |
| 5,303,241 | 4/1994 | Takada et al. | 370/513 |
| 5,418,815 | 5/1995 | Ishikawa | 375/216 |
| 5,521,927 | 5/1996 | Kim et al. | 370/474 |
| 5,559,999 | 9/1996 | Maturi et al. | 395/551 |
| 5,596,420 | 1/1997 | Daum | 386/110 |

*Primary Examiner*—Parshotam S. Lall
*Assistant Examiner*—Viet Vu
*Attorney, Agent, or Firm*—McAulay Nissen Goldberg Kiel & Hand, LLP

[57] ABSTRACT

A circuit for detecting a synchronous word signal from a moving picture experts group (MPEG) bit stream in a video-audio decoding system which is capable of more easily detecting a synchronous word by detecting a data start position of an input bit stream used for a multimedia system using the moving picture experts group (MPEG) detecting identical level bits from a bit stream inputted, and comparing the bits at a time. The circuit includes a serial/parallel converter for converting a data of a synchronous signal transmitted thereto in series in a bit stream form into a parallel data in accordance with a clock signal inputted thereinto, a separating and comparing unit for separating identical level bit signals of a synchronous word from an output signal from the serial/parallel converter and generating a flag signal when the signal is detected, a controller for judging an input of a synchronous word as a flag signal and generating a data processing control signal, and a data processor for processing a parallel output signal from the serial/parallel converter in accordance with a data processing control signal from the controller and outputting a data.

5 Claims, 4 Drawing Sheets

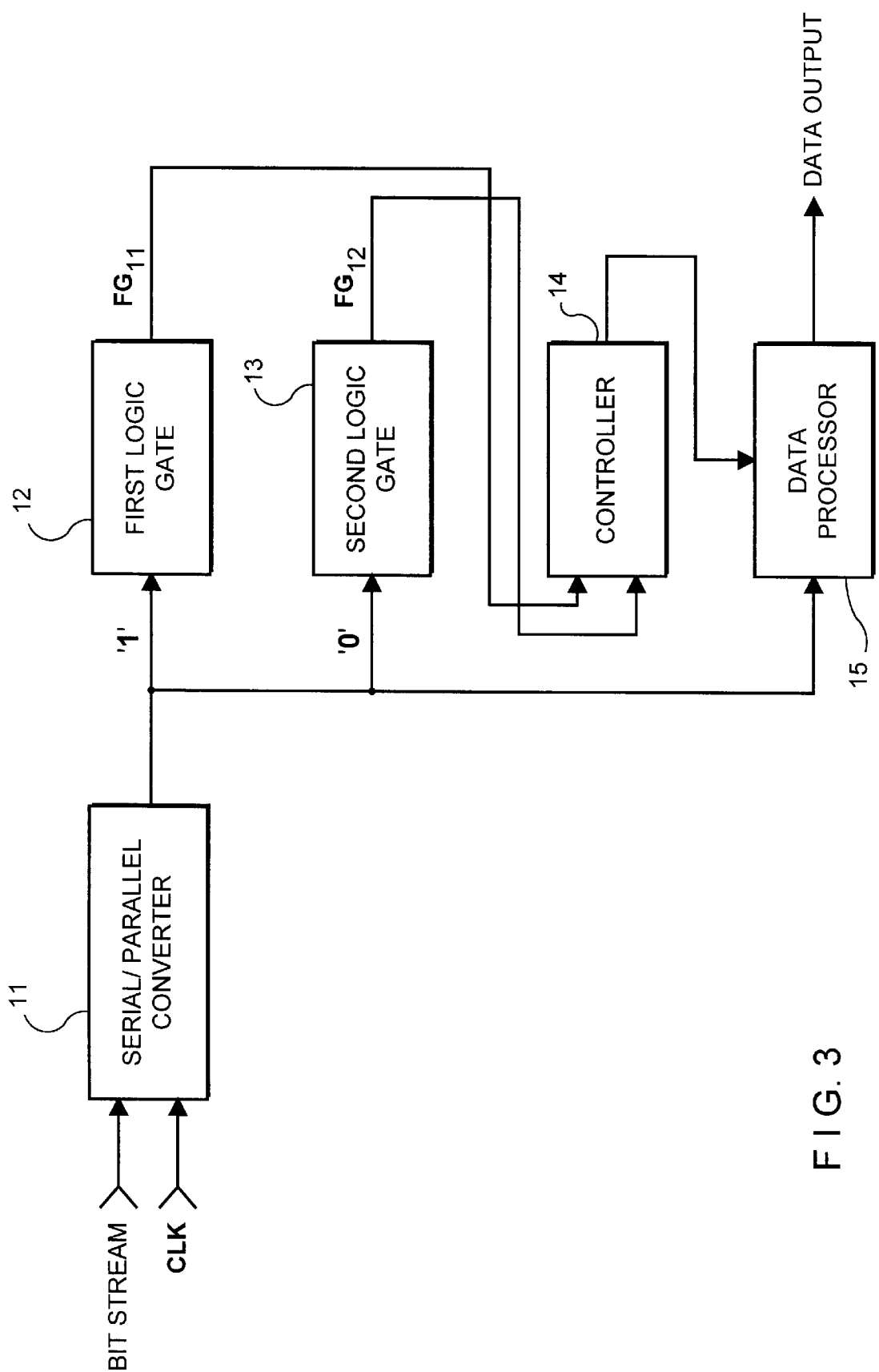
F I G. 3

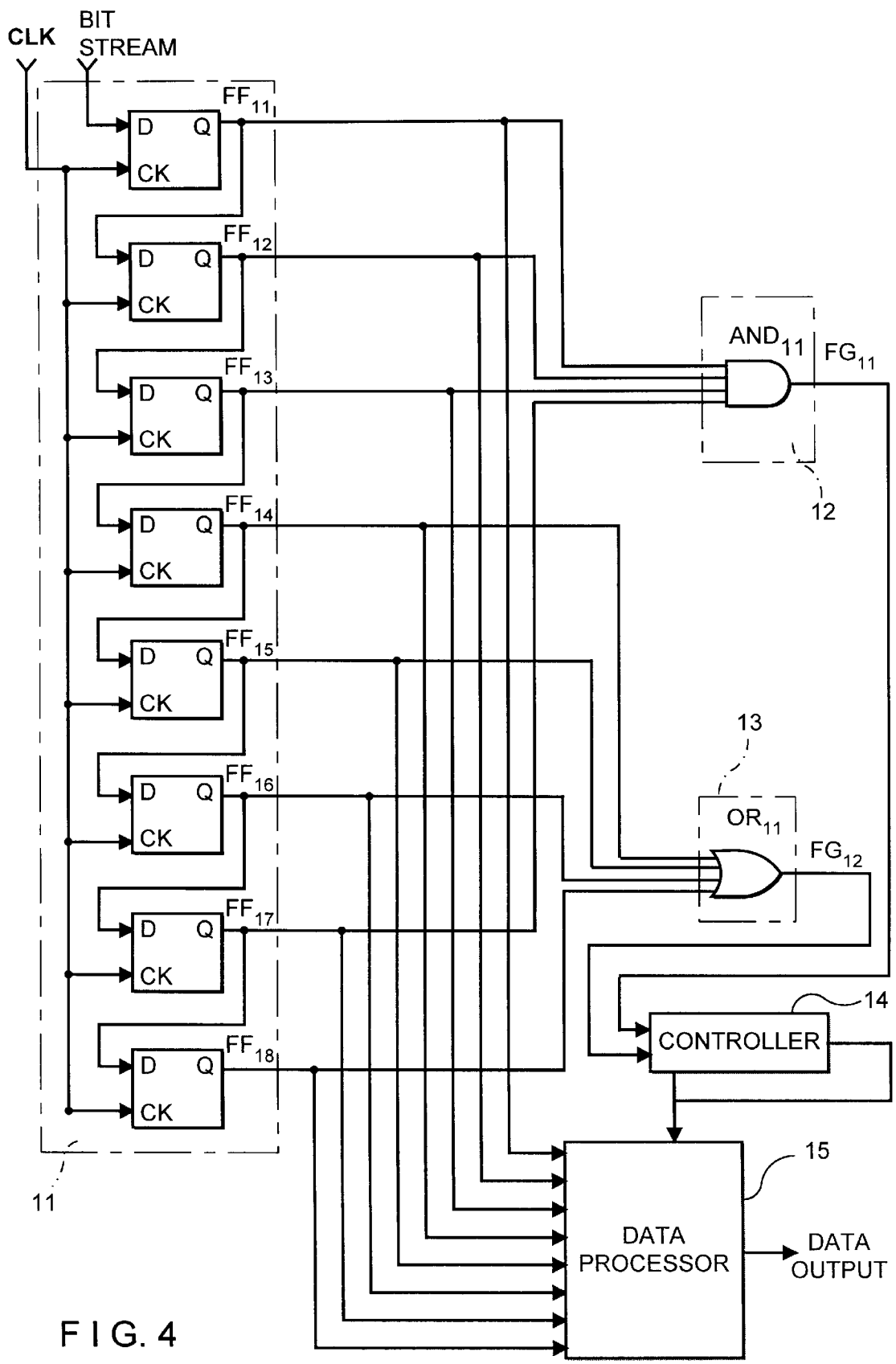
F I G. 4

CIRCUIT FOR DETECTING A SYNCHRONOUS WORD SIGNAL FROM A MPEG BIT STREAM IN VIDEO-AUDIO DECODING SYSTEM

BACKGROUND OF THE INVENTION

1. Field of the Invention

The present invention relates to a synchronous word detection circuit, and in particular, to an improved synchronous word detection circuit which makes it possible to more easily detect a synchronous word by detecting a data start position of an input bit stream used for a multimedia system using an MPEG (Moving Picture Experts Group), detecting identical level bits from a bit stream inputted, and comparing the bits at a time.

2. Description of the Conventional Art

Generally, when transmitting in series a data in a bit stream form, a synchronous word having a predetermined value is carried on a start position of a data.

In addition, a decoder which decodes a data transmitted thereto in a bit stream form detects a synchronous word from the data transmitted in a bit stream form, thus converting the data into an original data.

In the conventional art, the value with respect to bit of the synchronous word is set a reference value, and then the data inputted is compared with the bit of the reference value.

FIG. 1 illustrates a conventional synchronous word detection circuit, and FIG. 2 illustrates a conventional synchronous word detection circuit.

As shown in FIG. 1, the conventional synchronous word detection circuit includes a serial/parallel converter 1 for outputting a parallel data by sequentially shifting a data serially inputted thereto a bit stream form in a state that a clock signal CLK is inputted thereto, and a one-to-one comparator 3 for receiving a data from the serial/parallel converter 1 and a reference value from a reference value generator 2 and applying a flag FG to the decoder when the parallel data and reference value are identical.

FIG. 2 illustrates a detailed configuration when the data of a synchronous word detected in the circuit of FIG. 1 is "1111 0000". As shown therein, in the serial/parallel converter 1, flip-flops FF1 through FF8 are connected in series in such a manner that the input terminal D of a first flip-flop FF1 receives a data transmitted thereto in a bit stream form, and the clock terminals CK of the flip-flops FF1 through FF8 receive a clock signal CLK, respectively.

In addition, in the one-to-one comparator 3, the output terminals Q of the flip-flops FF1 through FF8 are connected with input terminals of AND-gates AND1 through AND4 and OR-gates OR1 through OR4, and a reference value from the reference value generator 2 is inputted into other input terminals of the AND-gate AND1 through AND4 and the OR-gates OR1 through OR4, respectively. In addition, the output terminals of the AND-gates AND1 through AND4 and the OR-gates OR1 through OR4 are connected with the input terminals of a NOR-gate NOR1 and a NAND-gate NAND1, respectively, so that flag signals FG1 and FG2 are outputted from the output terminals of the NOR-gate NOR1 and the NAND-gate NAND1.

In the thusly constituted conventional synchronous word detection circuit, when a data is inputted in series in a bit stream form in a state that the clock signal CLK is inputted, the thusly inputted data are sequentially shifted through the flip-flops FF1 through FF8 of the serial/parallel converter 1 in accordance with a clock signal CLK, thus outputting a parallel data.

In addition, the data from the flip-flops FF1 through FF8 are transmitted to the input terminals of the AND-gates AND1 through AND2 and the OR-gates OR1 through OR4 of the one-to-one comparator 3, respectively, and the other input terminals of the AND-gates AND1 through AND4 and OR-gates OR1 through OR4 receive a reference value in accordance with the synchronous word from the reference value generator 2.

Assuming that the data of the synchronous word is configured in a form of "1111 0000", the reference value generator 2 outputs a synchronous word data of "1111 0000", and the thusly outputted data of "1111 0000" is transmitted to the other input terminals of the AND-gates AND1 through AND4 and the OR-gates OR1 through OR4.

When the synchronous word of "1111 0000" is inputted, the data of "1111 0000" are outputted from the output terminals Q of the flip-flops FF8 through FF1 of the serial/parallel converter 1, and then are transmitted to the input terminals of the OR-gates OR4 through OR1 and the AND-gates AND4 through AND1.

Thereafter, since the AND-gates AND1 through AND4 all output low level signals, and the OR-gates OR1 through OR4 all output high level signals, the NOR-gate NOR1 outputs a high level flag signals FG1, and the NAND-gate NAND1 outputs a low level flag signal FG2, thus judging that a predetermined data inputted is a synchronous word.

In addition, on the contrary, when another data except for the synchronous word is inputted, one of the AND-gates AND1 through AND4 outputs a high level signal, or one of the OR-gates OR1 through OR4 outputs a low level signal.

Therefore, the NOR-gate NOR1 outputs a low level signal or the NAND-gate NAND1 outputs a high level signal, so that it is judged that the data inputted is not a synchronous word.

However, in the conventional art, logic gates are used for each bit signal for comparing the bit signal of the synchronous word with a previously set reference value.

Therefore, in an MPEG I in which the synchronous word is configured in a form of "0X000001BA$_{HEX}$" (where X denotes a predetermined value, and HEX denotes hexadecimal number), 32 logic gates are required for comparing the synchronous words by the bits. In addition, a transport stream of an MPEG II in which the synchronous word is configured in a form of "0X47$_{HEX}$" needs 8 logic gates. Therefore, in the system for decoding the MPEG I and the MPEG II, 40 logic gates are needed. Therefore, many logic gates are disadvantageously used in the circuit, so that the construction of the circuit is complicated, and the fabrication cost is high. Furthermore, in other systems, the logic gages are required as many as the number of bits of the synchronous word, so that the construction is complicated, and the fabrication cost is high.

SUMMARY OF THE INVENTION

Accordingly, it is an object of the present invention to provide a synchronous word detection circuit which overcomes the aforementioned problems encountered in the conventional art.

It is another object of the present invention to provide an improved synchronous word detection circuit which is capable of more easily detecting a synchronous word by detecting a data start position of an input bit stream used for a multimedia system using a moving picture experts group (MPEG), detecting identical level bits from a bit stream inputted, and comparing the bits at a time.

It is another object of the present invention to provide an improved synchronous word detection circuit which is capable of more easily detecting a synchronous word by using a fewer number of logic gates.

To achieve the above objects, there is provided a synchronous word detection circuit which includes a serial/parallel converter for converting a data of a synchronous signal transmitted thereto in series in a bit stream form into a parallel data in accordance with a clock signal inputted thereinto, a separating and comparing unit for separating identical level bit signals of a synchronous word from an output signal from the serial/parallel converter and generating a flag signal when the signal is detected, a controller for judging an input of a synchronous word as a flag signal and generating a data processing control signal, and a data processor for processing a parallel output signal from the serial/parallel converter in accordance with a data processing control signal from the controller and outputting a data.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a block diagram illustrating a synchronous word detection circuit according to the present invention; and FIG. 4 is a circuit diagram illustrating a synchronous word detection circuit according to the present invention.

DETAILED DESCRIPTION OF THE INVENTION

Figure 1:
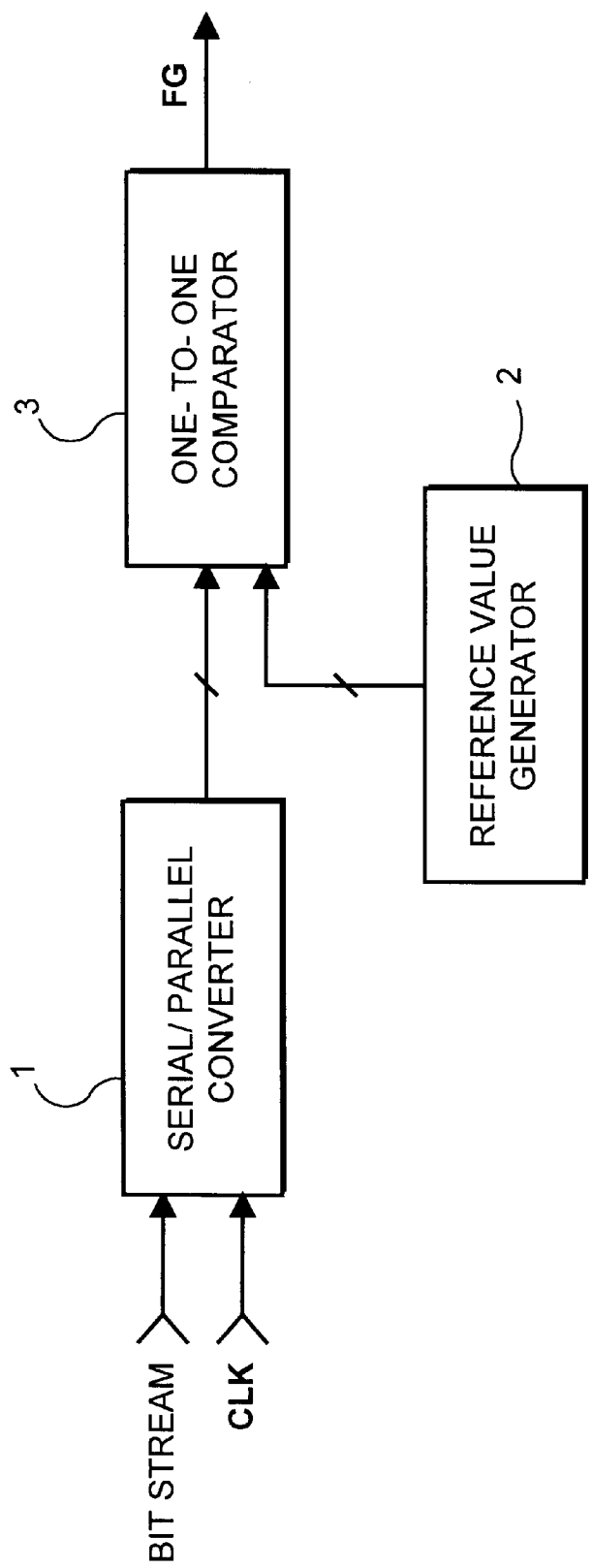
FIG. 1 is a block diagram illustrating a conventional synchronous word detection circuit.
Figure 2:
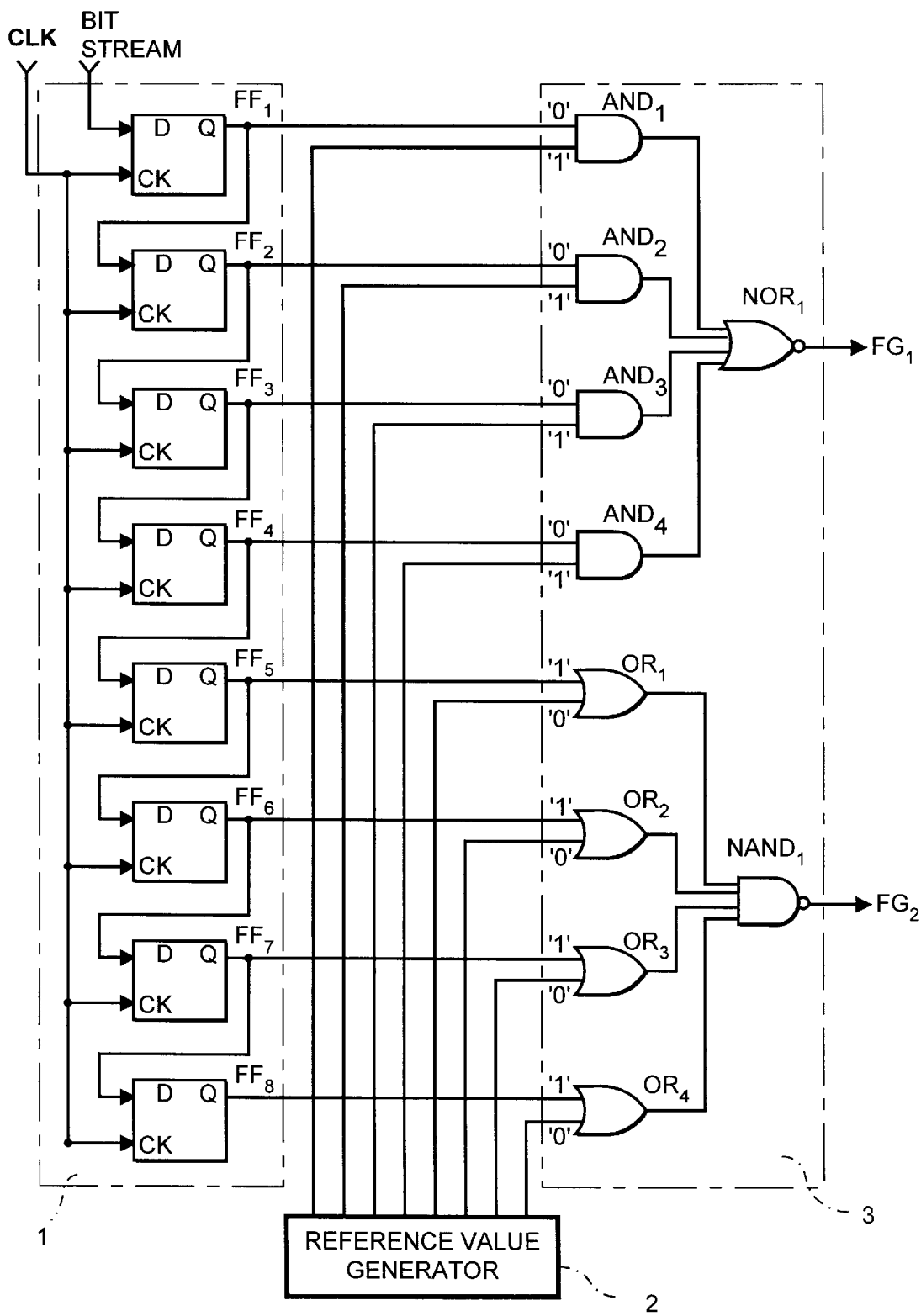
FIG. 2 is a circuit diagram illustrating a conventional synchronous word detection circuit.

FIG 3 illustrates a synchronous word detection circuit according to the present invention, and FIG. 4 illustrates a synchronous word detection circuit according to the present invention.

As shown therein, the synchronous word detection circuit according to the present invention includes a serial/parallel converter 11 for converting a serial data from a bit stream into a parallel data in accordance with a clock signal CLK, a first logic gate 12 for detecting a high level bit signal of a synchronous word from the output signals from the serial/parallel converter 11 and generating a first flag signal FG11, a second logic gate 13 for detecting a low level bit signal of a synchronous word from the output signals from the serial/parallel converter 11 and generating a second flag signal FG12, a controller 14 for judging an input of a synchronous word based on the first flag signal FG11 and the second flag signal FG12 and generating a data processing control signal, and a data processor 15 for processing the output signal from the serial/parallel converter 11 in accordance with a data processing signal from the controller 14.

FIG. 4 illustrates a detailed circuit for detecting an input of "0100 0111" which is a "0X47$_{HEX}$" of a transport stream of an MPEG II from the first logic gate 12 and the second logic gate 13, namely, the input of "0100 0111" which is a lower 8-bit.

As shown therein, in the serial/parallel converter 11, flip-flops FF11 through FF18 are connected in series, and the input terminal D of the first flip-flop FF11 receives a data transmitted thereto in a bit stream form, and the clock terminals CK of the flip-flops FF11 through FF18 receive a clock signal CLK.

In addition, in the first logic-gate 12, an AND-gate AND11 ANDs the output signals from the flip-flops FF11 through FF13 and FF17 which output a logic value of 1, respectively, from an 8-bit signal of "0100 0111" of a synchronous word of a transport stream of an MPEG II and outputs a first flag signal FG11, and in the second logic gate 13, an OR-gate OR11 ORs the output signals from the flip-flops FF14 through FF16 and FF18 which output a logic value of 0 from a lower 8-bit signal of "0100 0111" of a synchronous word of a transport stream of the MPEG II and outputs a second flag signal FG12.

The operation of a synchronous word detection circuit according to the present invention will now be explained with reference to the accompanying drawings.

First, in a state that a clock signal CLK is inputted into the circuit, when a data is inputted in a bit stream form, the inputted data are sequentially shifted through the flip-flops FF11 through FF18 of the serial/parallel converter 11 in accordance with a clock signal CLK and are outputted as parallel data.

Here, the output signals from the flip-flops FF11 through FF13 and FF17 which output a logic value of 1 from a lower 8-bit signal of "0100 0111" of a synchronous word of the transport stream of the MPEG II are inputted into the AND-gate AND11 of the logic gate 12, and the output signals from the flip-flops FF14 through FF16 and FF18 which output a logic value of 0 from a lower 8-bit signal of "0100 0111" of a synchronous word of a transport stream of the MPEG II are inputted into an OR-gate OR11 of the second logic gate 13.

When a lower 8-bit signal of "0100 0111" of a synchronous word of a transport stream of the MPEG II is inputted, since the input terminal of the AND-gate AND11 receives a high level signal, the AND-gate AND11 outputs a high level first flag signal FG11. In addition, since the input terminal of the OR-gate OR11 receives a low level signal, the OR-gate OR11 outputs a low level second flag signal FG12.

When a high level first flag signal FG11 from the AND-gate AND11 and a low level second flag signal FG12 from the OR-gate OR11 are inputted into the controller 14, respectively, the controller 14 judges that the first flag signal FG11 and the second flag signal FG12 are inputted as synchronous signals, and then outputs a data processing control signal, and the data processor 15 processes the data parallely outputted from the serial/parallel converter 11 in accordance with a data processing control signal.

In addition, when another data which is not a lower 8-bit signal of a "0100 0111" of a synchronous word of a transport stream of the MPEG II is inputted, one of the output signal from the flip-flops FF11 through FF13 and FF17 is outputted a low level signal, or one of the output signals from the flip-flops FF14 through FF16 and FF18 is outputted as a high level signal.

Therefore, the AND-gate AND11 outputs a low level signal, or the OR-gate OR11 outputs a high level signal. The controller 14 judges that a synchronous word is not inputted thereto. Namely, it judges that a predetermined data is inputted thereinto. Therefore, the controller 14 does not output a data processing control signal.

So far, the detection of the synchronous word of a transport stream of the MPEG II was explained. The synchronous word detection circuit according to the present invention is configured to detect the synchronous word of another system as well as a synchronous word of a transport stream of the MPEG II by increasing the numbers of the flip-flops FF11 through FF18 in accordance with a synchronous word to be detected and by selectively outputting the output signal from the flip-flops FF11 through FF18 to the input terminals of the AND-gate AND11 and the OR-gate OR11.

In addition, so far, the operation that the AND-gate AND11 ANDed the output signals from the flip-flops FF11 through FF13 and FF17 and outputted a first flag signal FG11, and the OR-gates FG11 ORed the output signals from the flip-flops FF14 through FF16 and FF18 and outputted a second flag signal FG12 was explained. However, in this embodiment of the present invention, another logic-gate except for the AND-gate AND11 and the OR-gate OR11 may be used for the identical purpose of the present invention.

As described above, in the synchronous word detection circuit according to the present invention, it is possible to more easily configure the circuit which is capable of detecting an input of a synchronous word by using the logic gates in accordance with a logic value of a synchronous word, thus reducing the number of elements of the circuit and decreasing the fabrication cost. In addition, it is possible to enhance the productivity and reduce the size of the circuit.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A circuit for detecting a synchronous word signal from MPEG bit stream in a video-audio decoding system, comprising:

a serial/parallel converter for converting a data of a synchronous signal transmitted thereto in series in a bit stream form into a parallel data in accordance with a clock signal inputted thereinto;

a separating and comparing means for separating identical level bit signals of a synchronous word from an output signal from the serial/parallel converter and generating a flag signal when the signal is detected;

a controller for judging an input of a synchronous word as a flag signal and generating a data processing control signal; and a data processor for processing a parallel output signal from the serial/parallel converter in accordance with a data processing control signal from the controller ad outputting a data.

2. The circuit of claim 1, wherein said separating and comprising means includes:

a first logic gate for judging a bit signal of a synchronous word in which a logic value is a high level from an output signal from the serial/parallel converter and generating a first flag signal; and a second logic gate for judging a bit signal of a synchronous word in which a logic value is a low level from an output signal from the serial/parallel converter and generating a second flag signal.

3. The circuit of claim 2, wherein said first logic gate is an AND-gate.

4. The circuit of claim 2, wherein said second logic gate is an OR-gate.

5. The circuit of claim 3, wherein said second logic gate is an OR-gate.

* * * * *